(12) United States Patent
Ciano et al.

(10) Patent No.: US 10,692,157 B2
(45) Date of Patent: Jun. 23, 2020

(54) SELECTION OF INFORMATION SOURCES BASED ON SOCIAL ACTIVITIES

(71) Applicant: International Business Machines Corporation, Armonk, NY (US)

(72) Inventors: Giuseppe Ciano, Rome (IT); Marco Esposito, Rome (IT); Luigi Pichetti, Rome (IT)

(73) Assignee: International Business Machines Corporation, Armonk, NY (US)

(*) Notice: Subject to any disclaimer, the term of this patent is extended or adjusted under 35 U.S.C. 154(b) by 459 days.

(21) Appl. No.: 15/471,118

(22) Filed: Mar. 28, 2017

(65) Prior Publication Data

US 2018/0285423 A1    Oct. 4, 2018

(51) Int. Cl.
*G06F 15/16*   (2006.01)
*G06Q 50/00*   (2012.01)
*G06Q 30/02*   (2012.01)
*G06Q 30/00*   (2012.01)

(52) U.S. Cl.
CPC ......... *G06Q 50/01* (2013.01); *G06Q 30/0241* (2013.01); *G06Q 30/016* (2013.01)

(58) Field of Classification Search
None
See application file for complete search history.

(56) References Cited

U.S. PATENT DOCUMENTS

| | | | |
|---|---|---|---|
| 8,239,399 B2 | 8/2012 | Govani et al. | |
| 8,372,222 B2 | 2/2013 | Pfaffmann et al. | |
| 9,009,094 B2 | 4/2015 | Bauer | |
| 2010/0057675 A1 | 3/2010 | White et al. | |
| 2010/0179948 A1* | 7/2010 | Xie | G06F 16/24573 707/706 |
| 2013/0117281 A1* | 5/2013 | Fleet | G06Q 10/10 707/748 |
| 2014/0122456 A1* | 5/2014 | Dies | G06F 16/951 707/706 |
| 2014/0201231 A1 | 7/2014 | Smith et al. | |
| 2016/0359790 A1* | 12/2016 | Zhang | G06F 16/285 |

OTHER PUBLICATIONS

Milne et al., A Knowledge-Based Search Engine Powered by Wikipedia, CIKM'07, Nov. 6-9, 2007, Lisbon, Portugal, 10 pages.

* cited by examiner

*Primary Examiner* — Alex Gofman
(74) *Attorney, Agent, or Firm* — Schmeiser, Olsen & Watts, LLP; William Hartwell (57) ABSTRACT

A method, computer system, and computer program product for retrieving information is provided. The method comprises receiving an information request, determining corresponding confidence indexes of a plurality of information sources, each of the confidence indexes being indicative of a capability of the corresponding information source to respond to the information request determined according to one or more social activities relating thereto, selecting a selected information source of said information sources according to the confidence indexes, submitting the information request to the selected information source, receiving selected information from the selected information source in response to the information request, and returning the selected information as a result of the information request.

12 Claims, 6 Drawing Sheets

SELECTION OF INFORMATION SOURCES BASED ON SOCIAL ACTIVITIES

TECHNICAL FIELD

The present invention relates to information technology, and more specifically to retrieval of information.

BACKGROUND

The availability of information that is useful for some purpose is in general very important because information allows making accurate and timely decisions in a large number of situations. Particularly, in business environments, an easy and efficient access to the information that is required at any moment may play a key role for commercial success. An exemplary scenario may be when a ticket is opened in a support center for a problem that is experienced in a software product, in this case, a deep investigation is performed in an attempt to retrieve the information that may help solve the problem, such as solutions applied in the past to similar problems.

SUMMARY

A method, computer system, and computer program product is provided. A processor of a computing system receives an information request. Corresponding confidence indexes of a plurality of information sources are determined, each of the confidence indexes being indicative of a capability of the corresponding information source to respond to the information request determined according to one or more social activities relating thereto. A selected information source of the plurality of information sources is selected according to the confidence indexes. The information request is submitted to the selected information source, and the selected information is received from the selected information source in response to the information request. The selected information is returned as a result of the information request.

DETAILED DESCRIPTION

The process of retrieving information is quite challenging. Indeed, in most practical situations several information sources are available, so that the information may be retrieved (potentially) from all of the information sources. In this case, each information request for retrieving the required information is at first submitted to the different information sources; the information retrieved by all the information sources is then analyzed to identify the information that is actually of interest.

Several techniques have been proposed for facilitating the retrieval of information. For example, information aggregators leveraging different information sources are available. Generally, each information aggregator submits any information request to all the information sources and then combines the corresponding retrieved information, which a combination is then returned as a single result. Alternatively, it is possible, after submitting the information request to all the information sources as above, to estimate which information source has provided the best information according to a predefined algorithm and then to return the retrieved information only.

Moreover, techniques are available to expand any information request automatically for example, by leveraging online encyclopedia; in this way, the information request evolves interactively so as to become more and more effective, thereby improving the relevance of the retrieved information.

Information Retrieval (IR) techniques may also be used to facilitate the identification of the information of interest among the returned results. Alternatively, a knowledge-based approach supporting the expression of different types of relationships among keywords, different weightings of keyword relationships and altogether different contexts for sets of different keywords and keywords' relationships among one another may be used to refine search results. Moreover, several attempts have been made for retrieving information in response to information requests in natural language to obtain answers to freely posed questions.

Nevertheless, the process of retrieving the information of interest in any specific situation remains quite complex. Indeed, the use of the information sources may have a cost, for example, when information source's services are provided on a pay-per-use basis. In any case, the use of the information sources involves a corresponding consumption of computational resources, for example, network bandwidth, processing power, storage space. Moreover, the amount of information that is provided by the information sources may be very large; therefore, the identification of the information of interest is problematic and in any case very time consuming.

All of the above may adversely affect the quality of the information that is retrieved, which may have negative effects on the decisions that should be made and actions to be taken based on this information, for example, from a business point of view.

In general terms, the present disclosure is based on the idea of selecting the information sources according to social activities. Particularly, an aspect provides a method for retrieving information in a computing system, wherein an information source among a plurality of information sources is selected for the submission of an information request according to corresponding confidence indexes, each determined according to one or more corresponding social activities. A further aspect provides a computer program for implementing the method. A further aspect provides a corresponding computer program product. A further aspect provides a corresponding system.

Figure 1A:
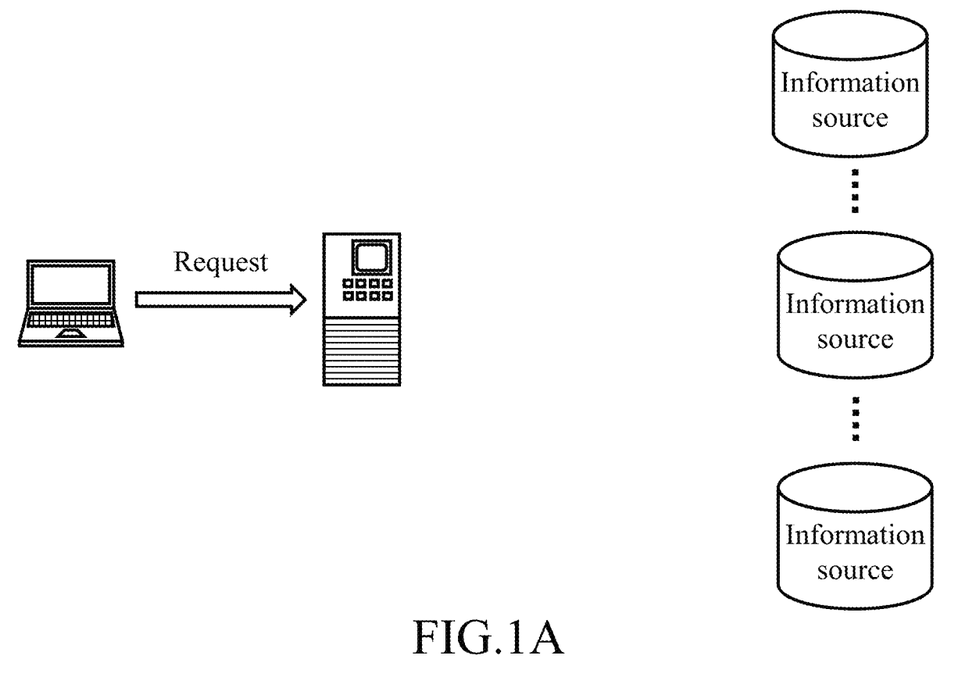
FIG. 1A is a block diagram of a system for retrieving information, in accordance with embodiments of the present invention.

Referring now to the drawings, FIG. 1A is a block diagram of a system for retrieving information, in accordance with embodiments of the present invention. An information request, or query, for retrieving information is received, for example, submitted by a user with a client computing machine thereof to a server computing machine, such as by opening a ticket for a problem experienced in a software product. A plurality of information sources are available for retrieving the information that is requested by the user, for example, online services operating on a pay-per-use basis.

Figure 1B:
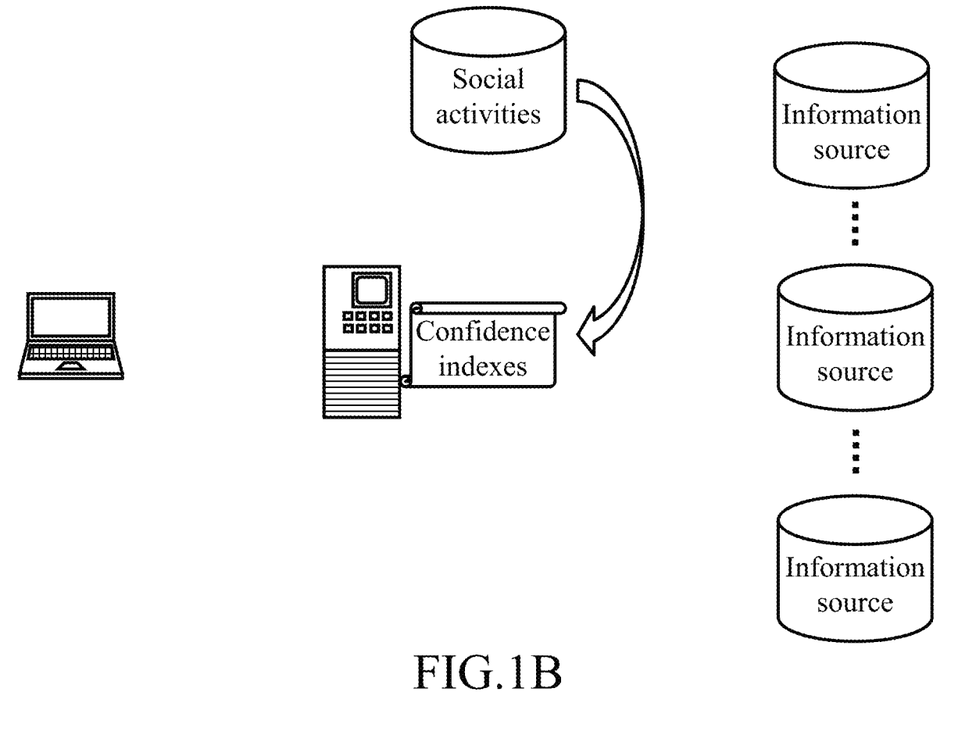
FIG. 1B is a block diagram of a system for determining confidence indexes of the information sources, in accordance with embodiments of the present invention.

FIG. 1B is a block diagram of a system for determining confidences indexes of the information sources, in accordance with embodiments of the present invention. For instance, FIG. 1B depicts an exemplary embodiment of the present disclosure, in response thereto corresponding confidence indexes of the information sources are determined. Each confidence index is indicative of a capability of the corresponding information source to respond to the information request; the confidence index is determined according to corresponding social activities relating to the handling of the information request in the information source, for example, social messages expressing a positive or negative attitude with respect to the information retrieved by the information source in response to similar information requests.

Figure 1C:
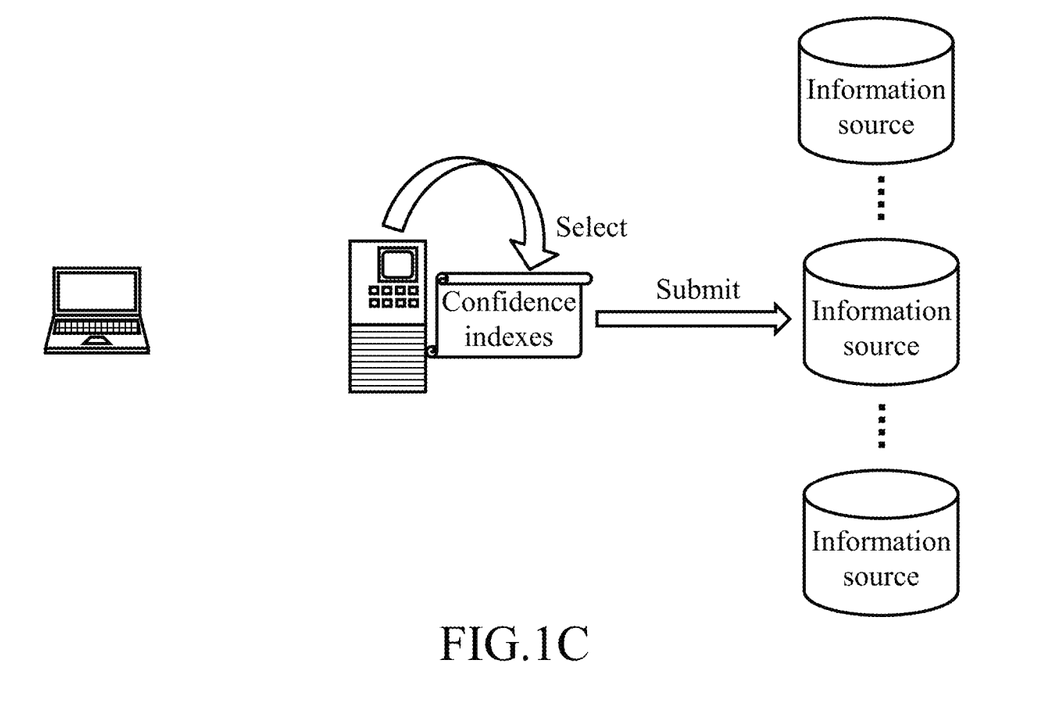
FIG. 1C is a block diagram of a system for selecting an information source according to a confidence index, in accordance with embodiments of the present invention.

FIG. 1C is a block diagram of a system for selecting an information source according to a confidence index, in accordance with embodiments of the present invention. For instance, FIG. 1C depicts an embodiment of an information source among all the information sources that are available being selected according to the confidence indexes, for example, the information source having the highest confidence index. The information request is then submitted to the selected information source only.

Figure 1D:
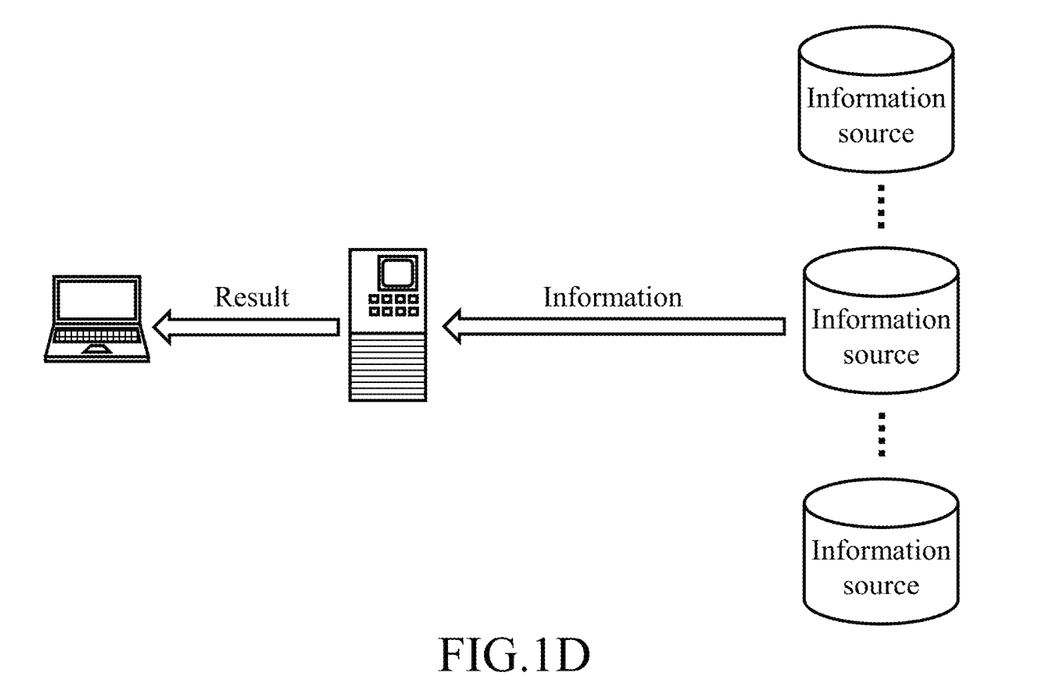
FIG. 1D is a block diagram of a system for retrieving selection information from the selected information source, in accordance with embodiments of the present invention.

FIG. 1D is a block diagram of a system for retrieving selection information from the selected information source, in accordance with embodiments of the present invention. For instance, selected information is received from the selected information source in response to the information request, for example, a list of documents that should be relevant thereto. The selected information is then returned to the user as a result of the information request.

The above-described solution significantly simplifies the process of retrieving the information of interest in any specific situation. Particularly, the information request is now submitted to a single information source or more generally to a reduced number of information sources. As a result, any cost relating to the use of the information sources, for example, when information source's services are provided on a pay-per-use basis is reduced accordingly. In any case, the consumption of computational resources involved by the use of the information sources, for example, network bandwidth, processing power, storage space is reduced.

Moreover, because the information is retrieved from a single information source or from a reduced number of information sources, an amount of retrieved information is limited accordingly. Therefore, the identification of the information that is actually of interest therein is simpler and faster. At the same time, the information is retrieved from the information sources that are predicted or estimated to be the most suitable for this purpose; therefore, the retrieved information is very likely to be particularly accurate.

All of the above significantly improves the quality of the information that is retrieved, which may have positive effects on the decisions that should be made based on the retrieved information, for example, from a business point of view.

Figure 2:
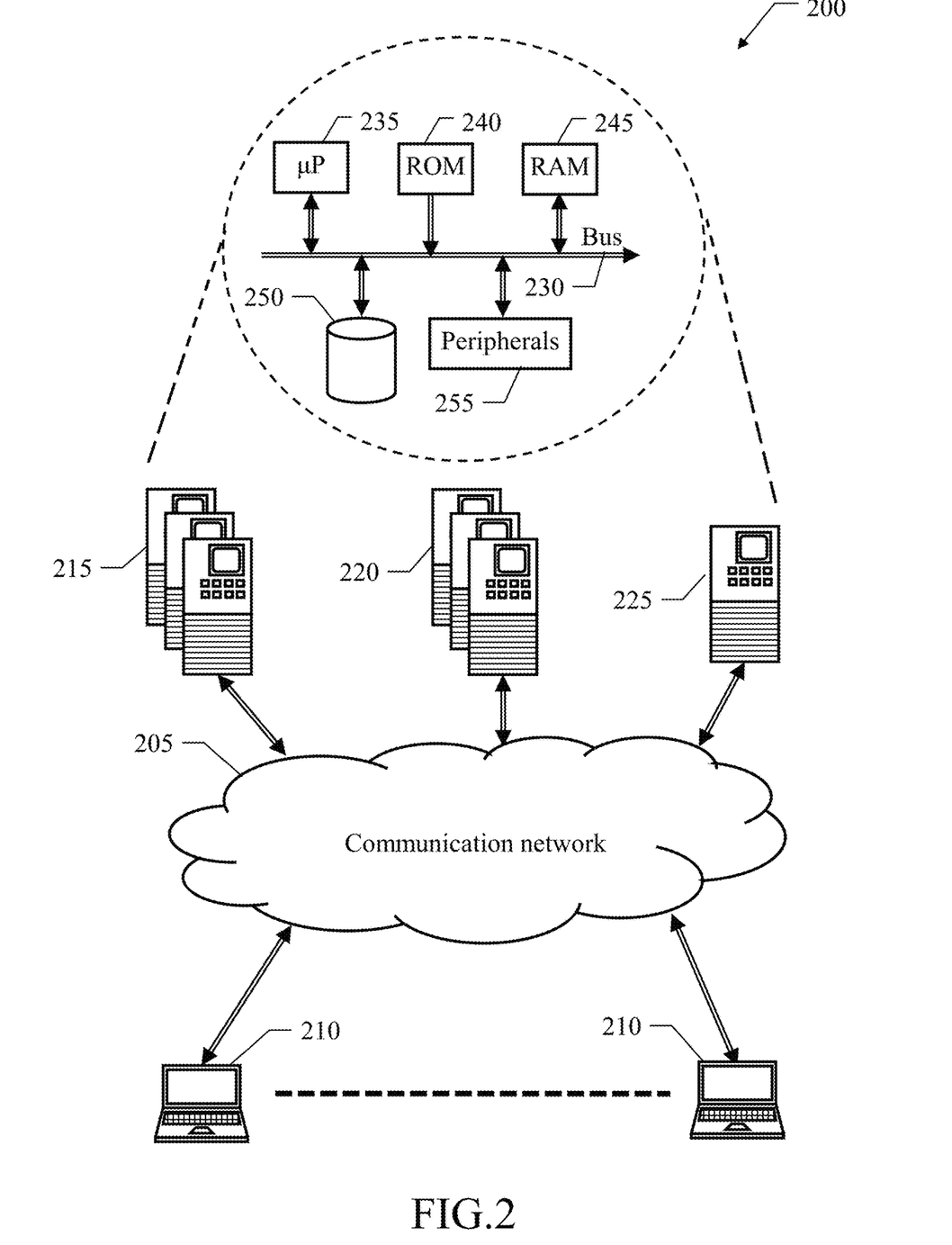
FIG. 2 is a schematic block diagram of a computing system, in accordance with embodiments of the present invention.

With reference now to FIG. 2, a schematic block diagram of a computing system 200, in accordance with embodiments of the present invention, is shown. A solution according to an embodiment of the present disclosure may be practiced and/or implemented by computing system 200.

The computing system 200 has a distributed architecture based on a communication network 205, for example, the Internet.

One or more client computing machines, or simply clients, 210 are used to access the communication network 205 by users thereof for submitting any desired information requests for corresponding information of interest. Several server computing machines, or simply servers, are connected to the communication network 205 as well, for example, implemented by corresponding nodes of one or more cloud providers. Particularly, a plurality of the servers, referred to as information servers 215, implement the information sources that are available to the users of the clients 210 for retrieving the information that is requested by the clients 210. Other servers (i.e. one or more social servers), referred to as social servers 220, implement corresponding social network services; in general, the social network services are used to share information among persons having similar interests, activities or connections, for example, for maintaining contacts, building relations or exchanging information. In an exemplary embodiment, another one of the servers (e.g. or more than one server), referred to as search server 225, controls the retrieval of the information required by the users of the clients 210 from the information servers 215.

Each computing machine of the computing system 200 (i.e. the clients 210, the information servers 215, the social servers 220 and the search server 225) comprises several units that are connected among them with a bus architecture 230 with one or more levels. Particularly, one or more microprocessors (µP) 235 control operation of the computing machine 210-225; a non-volatile memory (ROM) 240 stores basic code for a bootstrap of the computing machine 210-225 and a volatile memory (RAM) 245 is used as a working memory by the microprocessors 235. The computing machine 210-225 is provided with a mass-memory 250 for storing programs and data; for example, the mass-memory 250 of the clients 210 may comprise solid-state disks, whereas the mass-memory 250 of the (information, social and search) servers 215-225 may comprise storage devices of a data center wherein the servers 215-225 are implemented. Moreover, the computing machine 210-225 comprises a number of peripheral, or Input/Output (I/O), units 255; for example, the peripheral units 255 of the clients 210 may comprise a monitor, a keyboard, a mouse, a drive for reading/writing removable storage units (like DVDs) and a wireless network adapter for accessing the communication network 205, whereas the peripheral units 255 of the servers 215-225 may comprise a network adapter for plugging the peripheral units into the data center and a similar drive for reading/writing removable storage units implemented by a console of the data center.

Figure 3:
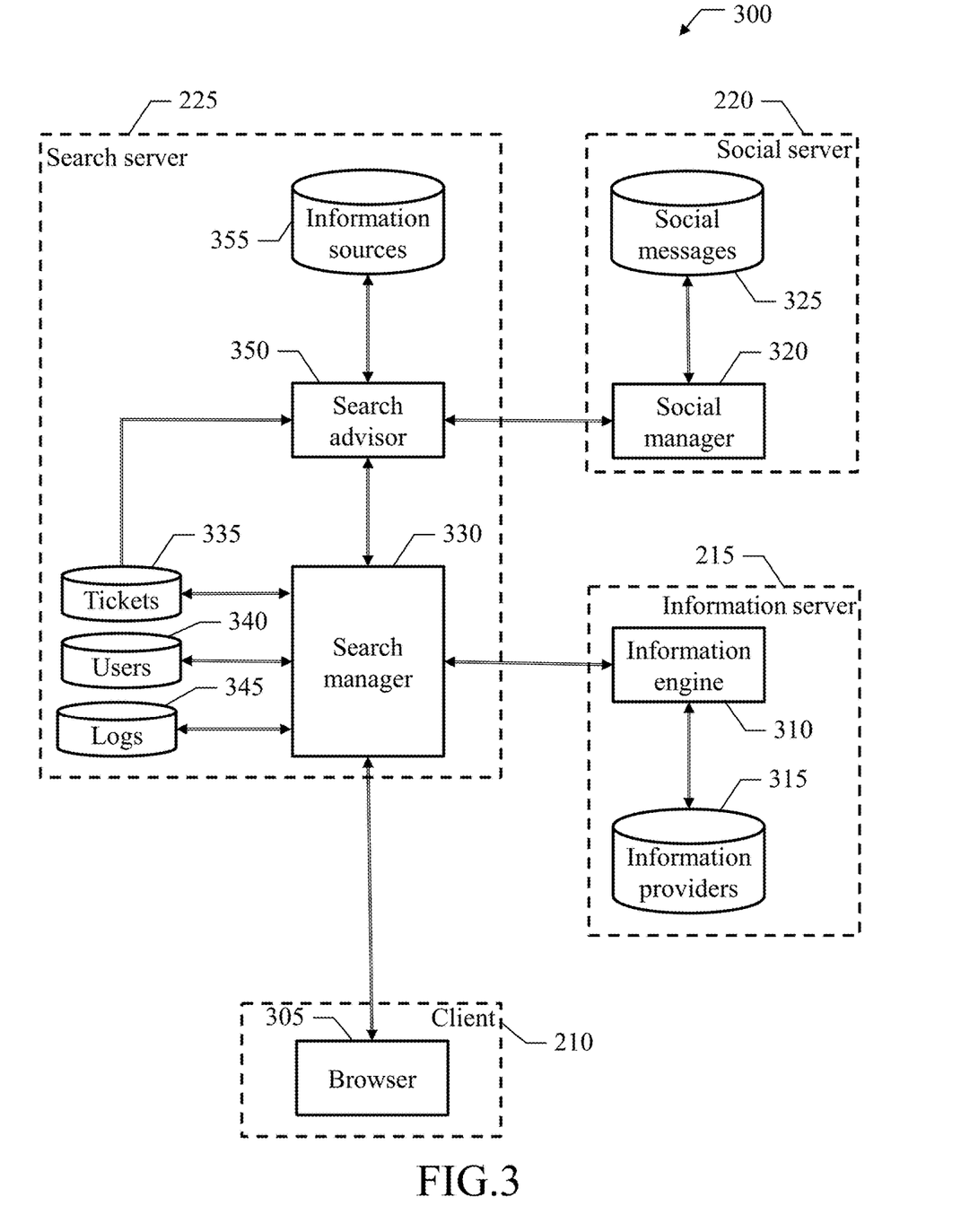
FIG. 3 is a block diagram of main software components, in accordance with embodiments of the present invention.

FIG. 3 is a block diagram of main software components, in accordance with embodiments of the present invention. The main software components are shown that may be used to implement embodiments of the present invention.

All the software components (e.g. programs and data) are denoted as a whole with the reference 300. The software components are typically stored in the mass memory and loaded (e.g. at least partially) into the working memory of the corresponding computing machines when the programs are running, together with an operating system and other application programs not shown in the figure. The programs are initially installed into the mass memory, for example, from removable storage units or from the communication network. In this respect, each program may be a module, segment or portion of code, which comprises one or more executable instructions for implementing the specified logical function.

Starting from each client 210, wherein only one client 210 is shown in FIG. 3, a browser 305, such as a web browser, is used to surf the Internet; as far as relevant to the present disclosure, the browser 305 allows the user of the client 205 to access the search server 225 for retrieving any information of interest.

Moving to each information server 215, wherein only one information server 215 is shown in FIG. 3, an information engine 310 implements a front-end of the corresponding information source for retrieving the information requested by the users of the clients 210. For this purpose, the information engine 310 exploits one or more information providers 315, for example, databases, knowledge bases.

Moving to each social server 220, wherein only one social server 220 is shown in FIG. 3, a social manager 320 implements a front-end of the corresponding social network service for sharing information among persons, comprising the users of the clients 210. The social manager 320 accesses in read/write mode a social message repository 325, which stores the social messages that have been shared among the persons that are registered in the social network service, and any information relating thereto, for example, their originators, chains of forwarding, evaluations.

Embodiments of the search server 225 may comprise the following components. A search manager 330 is used to manage any information requests that are submitted by the users of the clients 210, for example, within a problem tracking system for one or more software products. For this purpose, the search manager 330 interacts with the browser 305 of each client 210 and with the information engine 310 of each information server 215. Moreover, the search manager 330 accesses in read/write mode a ticket repository 335, which stores ticket information relating to any tickets that have been opened in the search manager 330 for corresponding problems experienced by the users of the clients 210. For example, for each ticket a corresponding record indicates the ticket's information request, the user that has submitted the information request (e.g. such as identified by organization and name), diagnostic information that has been collected in relation to the information request (e.g. such as indicating a software and/or hardware environment wherein the problem has occurred, like machine model, memory size, operating system, user options, and corresponding errors/warnings issued by the software product) and a tracking of the ticket (e.g. such as the ticket's opening and closing time, any information sources used to retrieve the corresponding information and feedback information provided by the user). The search manager 330 accesses in read/write mode a user repository 340, which stores user information relating to the users that may access the search manager 330 for submitting the information requests. For example, for each user the user repository 340 identifies the user by organization and name and indicates corresponding properties, such as location, language, and assets. The search manager 330 accesses in read/write mode a log repository 345, which stores log information relating to the software products that are supported by the search manager 330. For example, for each software product the log repository traces any events relevant to the software product's execution, such as errors and warnings.

The search manager 330 exploits a search advisor 350, which is used to select the information source to be used for responding to each information request. For this purpose, the search advisor 350 interacts with the social manager 320 of each social server 220, and the search advisor 350 accesses in read mode the ticket repository 335. Moreover, the search advisor 350 accesses in read/write mode an information source repository 355, which stores source information used to rank the information sources. For example, for each information source, such as identified by a corresponding URL, the information source repository 355 indicates one or more properties thereof, such as language, cost (e.g. per processing time or information amount) and average resource consumption (e.g. network bandwidth), and one or more confidence indexes. Each confidence index measures a capability of the information source to respond to a corresponding type of information requests according to social activities relating thereto in the social network services, for example, from 0 (low) to 1 (high). Each type of information request is defined by a common topic thereof, which is identified by one or more metadata that characterize the common topic, such as in the form of keywords. For example, the metadata indicate one or more entities to which the information requests relate, such as the involved software product, one or more concepts of the information requests, such as the problem that has been experienced in the software product, and the metadata context (such as hardware and/or software environment wherein the problem has occurred).

Figure 4A:
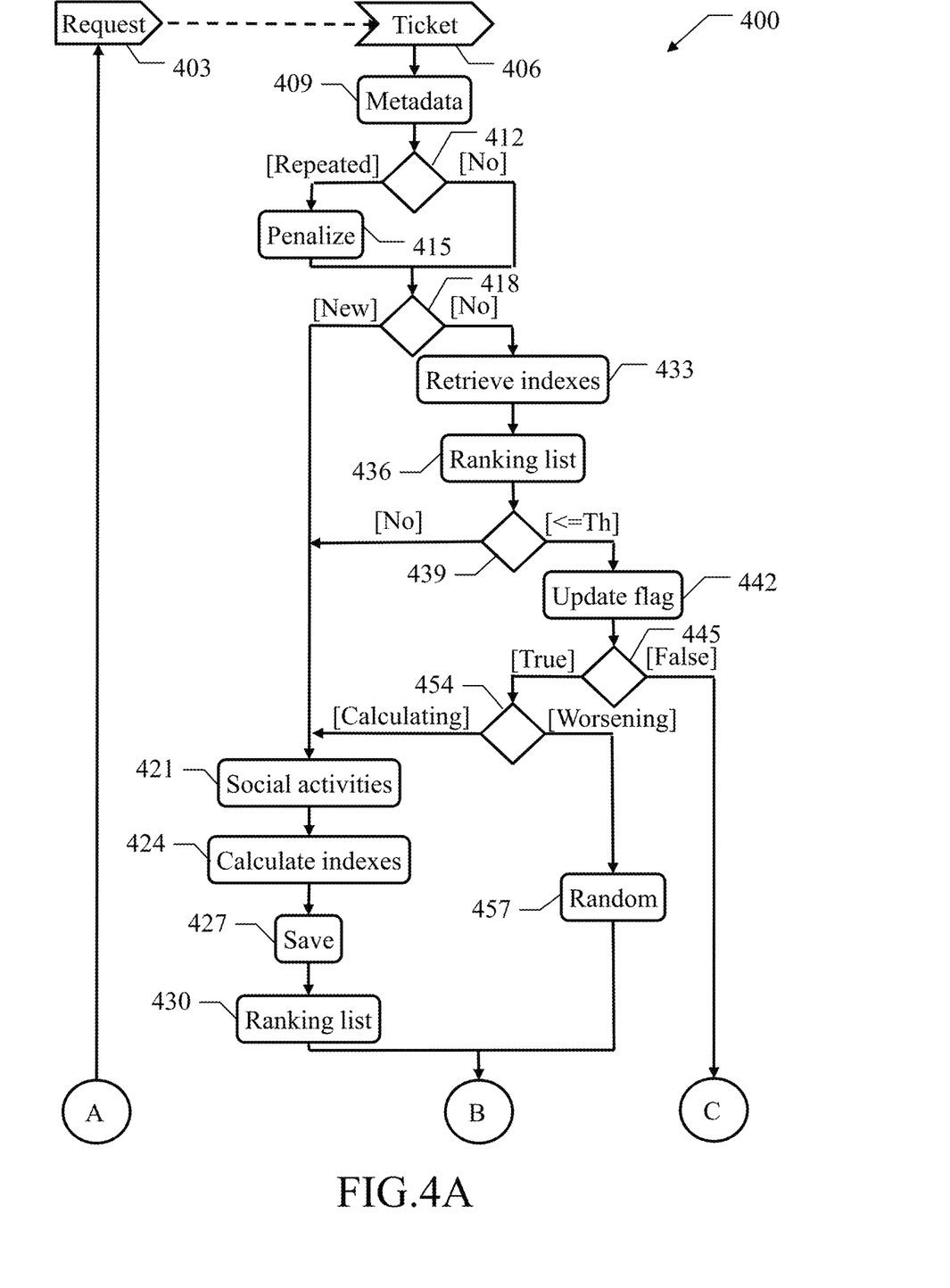
FIG. 4A is a first part of a flowchart of a method for retrieving information, in accordance with embodiments of the present invention.
Figure 4B:
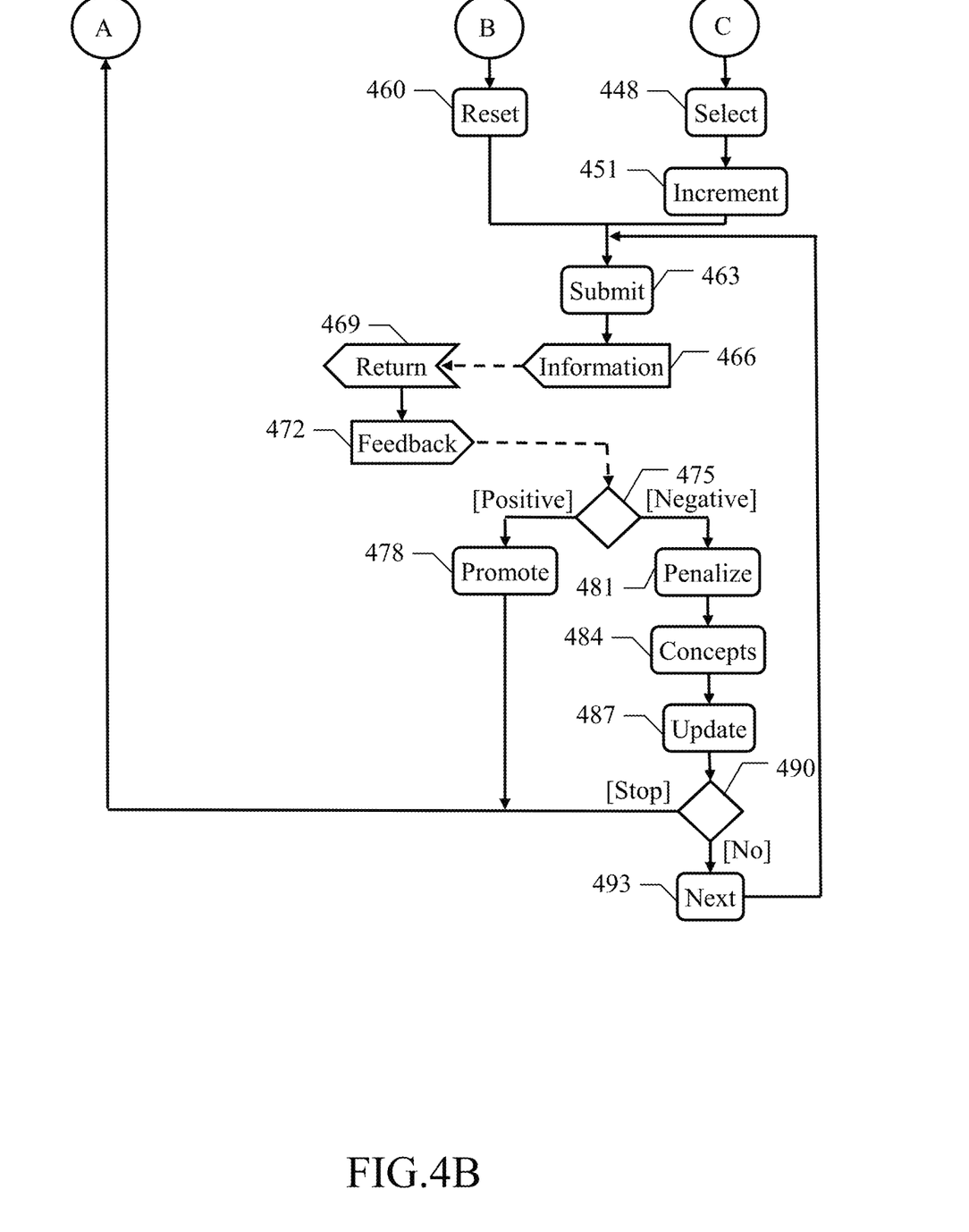
FIG. 4B is a second part of a flowchart of a method for retrieving information, in accordance with embodiments of the present invention.

With reference now to FIG. 4A-FIG. 4B, an activity diagram is shown describing the flow of activities relating to an implementation of the solution according to an embodiment of the present disclosure. FIG. 4A is a first part of a flowchart of a method for retrieving information, in accordance with embodiments of the present invention. FIG. 4B is a second part of a flowchart of a method for retrieving information, in accordance with embodiments of the present invention. Particularly, the diagram represents an exemplary process that may be used to retrieve information with a method 400. In this respect, each block may correspond to one or more executable instructions for implementing the specified logical function on the computer.

The process passes from block 403 to block 406 as soon as the search manager receives any information request from the browser of a corresponding user, for example, expressed in natural language. In response thereto, the search manager retrieves the corresponding user information from the user repository, such as organization, name, location, and language, and collects the corresponding diagnostic information at run-time, such as software and/or hardware environment wherein the problem has occurred, and/or from the log repository, such as corresponding errors/warnings. The search manager then opens a new ticket in the ticket repository accordingly. Continuing to block 409, the search advisor determines one or more metadata characterizing the information request according to the information request's content, the information request's user information, and the information request's diagnostic information, such as by leveraging a textual analyzer, like "Watson Explorer" by "IBM Corporation", trademarks thereof). For example, as above the metadata, in the form of keywords, indicate the language of the user, the entities to which the information request relates, such as the involved software product, the concepts of the information request, such as the experienced problem, and the metadata context, such as the hardware and/or software environment of the user.

The search advisor then determines the confidence indexes of the information sources with respect to the information request. For this purpose, at first the search advisor at block 412 verifies whether any matching ticket for the information request is present in the ticket repository. For this purpose, the ticket repository is scanned backwards in time starting from now at most back to a predefined extent (example e.g., 1-3 tickets of the same user), by looking for a most recent ticket of the same user matching the metadata of the information request, for the same problem experienced in the same software product with the same diagnostic information, for example, by leveraging a textual analyzer as above. If the matching ticket is found, this means that the same information request has been repeated in a short time by the user, so that it is very likely that the selected information returned by the information source of the matching ticket has not been satisfactory; therefore, in this case, the search advisor at block 415 updates the confidence index of the matching ticket for the topic of the information request as indicated by the entities, concepts and context of the information request's metadata in the information source repository that is always available so as to penalize this information source, for example, reducing the information source by a predefined percentage, such as 20-40%.

The process then continues to block 418; the same point is also reached directly from the block 412 if no matching ticket has been found. The search advisor now verifies whether the information source repository contains the confidence indexes of the information sources for the topic of the information request (as indicated by the entities, concepts and context of the information request's metadata. If not, this means that this is the first time that an information request for this topic is received; therefore, the search advisor determines the corresponding confidence indexes. For this purpose, the search advisor at block 421 retrieves an indication of the social activities relating to the topic from the corresponding social managers. For example, in each social network service the search advisor identifies the relevant social messages that relate to the topic according to the metadata of the information request, for example, by querying the social manager with the corresponding keywords. Continuing to block 424, the search advisor calculates the confidence indexes of the information sources for the topic. For this purpose, for each information source the search advisor identifies the social messages among the ones relating to the topic from all the social managers that relate to the information source, for example, by leveraging a textual analyzer. The search advisor then calculates the confidence index at first and mainly according to a sentiment in these social messages towards a handling of the topic in the information source. For example, the search advisor determines a polarity of each social message (i.e. a subjective attitude, judgment or evaluation of an originator of the social message with respect to how the information source has responded to previous information requests relating to the same topic, such as, positive or negative), for example, by applying sentiment analysis, or opinion mining, techniques. The positive social messages and the negative social messages contribute to increase and to decrease, respectively, the confidence index, for example, by setting the confidence index equal to the percentage of the positive social messages over all the positive/negative social messages. Optionally, the search advisor updates the confidence index according to a strength of the corresponding social activities. For example, the search advisor calculates a percentage of the social messages relating to the handling of the topic in the information source with respect to all the social messages; this percentage is then used to correct the confidence index accordingly, for example, by calculating a difference between this percentage and a threshold, such as 10-20%, and then increasing or decreasing the confidence index by a percentage, such as 0.1-5%, of the absolute value of this difference when the social message is positive or negative, respectively. In addition or in the alternative, optionally the search advisor updates the confidence index according to a reach or influence of the corresponding social activities. For example, the search advisor calculates a percentage of the unique originators of the social messages relating to the handling of the topic in the information source with respect to the originators of all the social messages; this percentage is then used to correct the confidence index accordingly. The search advisor at block 427 than saves the obtained confidence indexes by storing the confidence indexes into the information source repository.

Continuing to block 430, the search advisor ranks the information sources for responding to the search request, which is based at first and mainly on the corresponding confidence indexes just determined, for example, by ordering the information sources into a ranking list in decreasing order of the information source's confidence indexes. Optionally, the search advisor may also update the confidence indexes in the ranking list by taking into account to a lower extent the user information and/or the source information, for example, by promoting the information sources using the same language of the user and penalizing the information sources according to the information source's cost and resource consumption, such as by increasing and decreasing, respectively, the information source's confidence indexes by a predefined percentage. The search advisor then determines the selected information source for responding to the information request; the selected information source is set equal to a preferred information source for the topic, which is determined as the information source having the highest (e.g. possibly increased/decreased) confidence index in the ranking list.

Referring back to the block 418, if the information source repository already contains the confidence indexes of the information sources for the topic of the information request, the confidence indexes are retrieved therefrom at block 433. Continuing to block 436, the search advisor orders the information sources into the ranking list as above, but now directly according to the information source's confidence indexes that have been retrieved from the information source repository.

A test is then made at block 439, wherein the search advisor compares the confidence indexes of the information sources in the ranking list with a confidence threshold, for example, 40-60%. If none of these confidence indexes reaches the confidence threshold (e.g. the confidence indexes are all possibly strictly lower than the confidence threshold), this means that the confidence indexes that are currently stored in the information source repository do not ensure an acceptable degree of accuracy. In response thereto, the process passes to the block 421 again to update the confidence indexes of the information sources for the topic by retrieving the corresponding social activities, re-calculating the confidence indexes, ordering them into the ranking list, determining the preferred information source and selecting the information source for responding to the information request as above. Therefore, in this uncertain situation, the preferred information source is determined according to the most up-to-date corresponding social activities, so as to ensure that the information source is as accurate as possible.

Referring back to the block 439, if at least one of the confidence indexes of the information sources in the ranking list reaches the confidence threshold (e.g. the confidence index is possibly strictly higher than the confidence threshold) the process descends into block 442. At this point, an update flag defining an update condition is generated. The update flag is generated in a pseudo-random way, so as to be asserted, for example, at the logic value 1, with a first assertion probability Pa and to be deasserted, for example, at the logic value 0, with a second deassertion probability Pd=1−Pa, which is complementary to the assertion probability Pa. For example, it is possible to generate a pseudo-random number N from 0 to 1, and then to assert the update flag when 0<=N<=Pa and to deassert the update flag when N>Pa. The assertion probability Pa and the deassertion probability Pd are initialized a first time the confidence indexes for the topic are calculated to an assertion base value Vb and to the assertion base value's complement 1−Vb (i.e. deassertion base value), respectively, ensuring that the assertion probability Pa is far lower than the deassertion probability Pd, for example, with the base value Vb equal to 0-0.2, 0.001-0.1, or 0.005-0.05, such as 0.001 (and then Pa=0.01 and Pd=0.99). The flow of activity then branches at block 445 according to the value of the update flag.

If the update flag is deasserted, the process descends into block 448; in view of the above, since the assertion probability Pa is far lower than the deassertion probability Pd, at least at the beginning, statistically this will happen most of the times. In response thereto, the search advisor determines the selected information source for responding to the information request as above, by setting the selected information source equal to the preferred information source for the topic having the highest confidence index in the ranking list, always reaching the confidence threshold and then providing an acceptable degree of accuracy. Therefore, normally the confidence indexes for the topic of the information request are simply retrieved from the information source repository and then the selected information source is determined directly accordingly, without the need of actually retrieving the indication of the corresponding social activities from the social managers. In this way, the operation is very fast (i.e. substantially negligible with respect to the time required to retrieve the selected information from the selected information source), so as to ensure high performance. Continuing to block 451, at the same time the search advisor increments the assertion probability Pa and decrements the deassertion probability Pd by a same delta value ΔP. The deassertion/assertion probabilities Pa,Pd are updated slightly, so that the assertion probability Pa increases and then the deassertion probability Pd decreases slowly, at least at the beginning, which ensures that the assertion probability Pa remains far lower than the deassertion probability Pd for a relatively long time, during which the selected information source is determined directly from the corresponding confidence indexes retrieved from the information source repository most of the times, statistically. For this purpose, the probabilities Pa,Pd may be updated according to a logarithmic law, such as of time. For example, the assertion probability Pa and then the deassertion probability Pd=1−Pa may be calculated, at any time t, starting from an initialization, by setting $Pa(t)=\ln(e^{Vb}+t)$, with $Pa(0)=\ln(e^{Vb}+0)=Vb$.

Referring back to the block 445, if the update flag is asserted, the process instead descends into block 454; in view of the above, because the assertion probability Pa is far lower than the deassertion probability Pd at the beginning and then increases (e.g. slowly increases) as far as the update flag is deasserted, statistically this will happen very rarely, but less and less rarely over time. In response thereto, one of two possible update operations is performed for updating the confidence indexes corresponding to the topic of the information request, which allows maintaining the confidence indexes up-to-date and then switching to information sources that have become more effective recently; however, this operation, which is worse than the above described direct selection of the preferred information source according to the confidence indexes retrieved from the information source repository, is performed quite seldom and then it does not adversely affect the performance significantly. For example, the search advisor may be configured to perform a single one of the update operations always, or both of them alternatively over time. Particularly, a first update operation is implemented by passing to the block 421 again to update the confidence indexes of the information sources for the topic by retrieving the corresponding social activities, re-calculating the confidence indexes, ordering the information sources into the ranking list, determining the preferred information source and selecting the information source for responding to the information request as above. In this way, the confidence indexes are updated according to the current social activities relating thereto, which allows taking into account most recent, and then likely to be more significant, social activities. Returning to the block 454, alternatively, a second update operation is implemented by passing to the block 457, wherein the search advisor selects a worse information source, different from the preferred information source having the highest confidence index in the ranking list, for responding to the information request; for example, the worse information source is selected in a pseudo-random way among the information sources that have the information sources' confidence indexes not reaching the confidence threshold. At the same time, the search advisor increases the confidence index of the worse information source in the ranking list accordingly, such as up to the threshold value. In this way, every information source may be used over time irrespectively of the information source's confidence index, which allows verifying whether the capability of the worse information source to respond to the topic of the information request continues to be scarce or the information source has improved, thereby updating the information source's confidence index according to the corresponding feedback information, as described in the following.

The flow of activity then descends into block 460 from either the block 430 or the block 457. At this point, the search advisor initializes after calculating the confidence indexes for the first time or resets after performing any update operation the assertion probability Pa to the base value Vb and the deassertion probability Pd to its complement 1−Vb, so as to have the deassertion of the update flag far more likely statistically.

The flow of activity merges again at block 463 from the block 451 or from the block 460. The search manager now submits the information request to the information engine of the selected information source, so as to cause the search manager to retrieve the corresponding selected information from the selected information's information providers and to return the selected information to the search manager, for example, in the form of a list of information items, such as documents. The process then passes to block 466 as soon as the search manager receives the selected information from the search engine of the selected information source. In response thereto, the search manager at block 469 returns the selected information to the browser of the client as the result of the information request, for example, for allowing the user to browse the list of information items and to display the information items that are selected among the information items.

The process continues to block 472 as soon as the search manager receives the feedback information from the user relating to the result of the information request. The flow of activity then branches at block 475 according to this feedback information. Particularly, if the feedback information is positive, for example, when the user has closed the corresponding ticket after solving the ticket's problem, the process descends into block 478; at this point, the search advisor updates the confidence index of the selected information source for the topic of the information request so as to promote the selected information source, for example, increasing the information source by a predefined percentage, such as 20-40%. In this way, because the selected information source has been effective in responding to the information request, the possibility of using the information source again for responding to next information requests relating to the same topic is increased. The process then returns to the block 403 waiting for a next information request.

Referring back to the block 475, if the feedback information is negative, for example, when the user maintains the corresponding ticket open or the user has closed the ticket but without solving the ticket's problem, the process descends into block 481; at this point, the search advisor updates the confidence index of the selected information source for the topic of the information request so as to penalize the selected information source, for example, decreasing the information source by a predefined percentage, such as 20-40%. In this way, because the selected information source has been ineffective in responding to the information request, the possibility of using the information source for responding to next information requests relating to the same topic is reduced. In addition or alternatively, the search advisor at block 484 as above determines one or more metadata of the selected information returned by the selected information source indicating the selected information's concepts. Continuing to block 487, the search advisor updates the confidence index of the selected information source for the topic of the selected information, if any, so as to promote the selected information source, for example, increasing the information source by a predefined percentage, such as 10-20%. In this way, because the selected information source has instead been effective with respect to this topic, the possibility of using the information source for responding to next information requests relating thereto is increased. With reference now to block 490, if the user maintains the ticket open and other information sources, different from the previous selected information source, are still available in the ranking list, the search manager at block 493 removes the previous selected information source from the ranking list; at this point, the search manager determines a next selected information source for responding to the information request as above, by setting the information source equal to the preferred information source for the topic having the highest confidence index in the reduced ranking list. The process then returns to the block 436 to repeat the same operations with this selected information source. In this way, the selected information is now retrieved from the next selected information source that has the confidence index that is immediately lower than the one of the previous selected information source. Referring back to the block 490, if the ticket has been closed, either manually by the user or automatically when the ranking list has become empty because all the information sources have been tried unsuccessfully, the process returns to the block 403 waiting for a next information request.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details, such as the numerical values set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, each numerical value should be read as modified by the term about unless already done and each range of numerical values should be intended as expressly specifying any possible number along the continuum within the range comprising the range's end points. Moreover, ordinal or other qualifiers are merely used as labels to distinguish elements with the same name but do not by themselves connote any priority, precedence or order. The terms include, comprise, have, contain and involve (and any forms thereof) should be intended with an open, non-exhaustive meaning (i.e., not limited to the recited items), the terms based on, dependent on, according to, function of and any forms thereof should be intended as a non-exclusive relationship (i.e., with possible further variables involved), the term a/an should be intended as one or more items unless expressly indicated otherwise, and the term means for or any means-plus-function formulation should be intended as any structure adapted or configured for carrying out the relevant function.

For example, an embodiment provides a method for retrieving information in a computing system. However, the information may be of any type, for example, data, documents, code portions, software programs, news, and the information may be retrieved in any computing system.

In an embodiment, the method comprises receiving an information request. However, the information request may be of any type, for example, relating to a problem to be solved, a service to be obtained, data to be gathered, and in any form, for example, expressed in natural language, by keywords, in a query language; moreover, the information request may be received in any way, for example, locally or remotely through any interface, and from any user, for example, a person, a software program.

In an embodiment, the method comprises determining corresponding confidence indexes of a plurality of information sources. However, the confidence indexes may be of any type, for example, numbers, percentages, discrete values; moreover, the information sources may be in any number and of any type, for example, databases, knowledge bases, online services, aggregators of information sources, provided on a pay-per-use basis or free of charge, indiscriminately or requiring a registration thereto.

In an embodiment, each of the confidence indexes is indicative of a capability of the corresponding information source to respond to the information request determined according to one or more social activities relating thereto. However, the social activities relating to the handling of the information request in each information source may be in any number and of any type, i.e., relating to any interaction among persons, for example, social networks, discussions, publications even not in real-time; moreover, the confidence indexes may be determined in any way. For example, the confidence indexes may be calculated and saved for next uses at the beginning and later on sporadically, the confidence indexes may be calculated and saved for next uses only once, the confidence indexes may be calculated at run-time always, for example, in case the accuracy is more important that the performance.

In an embodiment, the method comprises selecting a selected information source of the information sources according to the confidence indexes. However, the selected information source may be determined in any way, for example, only according to the social activities or further according to any number and type of additional criteria, such as language, location, costs, resource consumptions, available assets.

In an embodiment, the method comprises submitting the information request to the selected information source. However, the information request may be submitted in any way, for example, locally or remotely, by a command, a query or a message.

In an embodiment, the method comprises receiving selected information from the selected information source in response to the information request. However, the selected information may be received in any way, for example, transmitted, uploaded, made available in a shared area, and in any form, for example, a list of information items and actual contents of the information items.

In an embodiment, the method comprises returning the selected information as a result of the information request. However, the selected information may be returned in any way and in any form, either the same or different with respect to their receiving.

In an embodiment, the information sources are accessible through a communication network. However, the communication network may be of any type, for example, the Internet, a wide area network (WAN), and a local area network (LAN).

In an embodiment, the step of determining corresponding confidence indexes comprises determining each of the confidence indexes according to the corresponding social activities in one or more social network services implemented over the communication network. However, the social network services may be in any number and of any type, for example, chats, forums, and bulletin boards.

In an embodiment, the step of determining corresponding confidence indexes comprises updating the confidence indexes by retrieving an indication of the social activities, calculating the confidence indexes according to the social activities and storing the confidence indexes in response to an update event, or retrieving the confidence indexes being stored otherwise. However, the confidence indexes may be updated in response to any type of update event, for example, when none of the confidence indexes reaches the confidence threshold, randomly, periodically, in response to a negative feedback by the user, and any combination thereof.

In an embodiment, the step of updating the confidence indexes comprises collecting one or more corresponding social messages shared among persons in the social network services relating to a topic of the information request in each of the information sources. However, the social messages may be of any type, i.e., any information content, for example, new contents, comments to other contents, ratings assigned thereto, that is shared among persons in any way, for example, posted, and entered in a form; moreover, the topic of the information request may be defined in any way, for example, by keywords, parameter/value pairs relating to any aspect thereof, either determined automatically or entered manually by the user, and the social messages may be collected in any way for the topic of the information request in each information source, for example, identifying them by natural language processing techniques, queries based on keywords, and hashtags.

In an embodiment, the step of updating the confidence indexes comprises calculating each of the confidence indexes according to a sentiment in the corresponding social messages with respect to the topic of the information request in the corresponding information source. However, each confidence index may be calculated in any way according to the sentiment in the corresponding social messages, for example, based on any type of polarity, such as neutral, angry, sad, or happy, or according to additional or different criteria, for example, based on strength or reach, in any combination, moreover, the confidence index by be calculated with any algorithm, for example, according to the number of social messages, by weighting the social messages according to their sentiment strength, forwarding, opinions assigned thereto, according to a number of followers, according to any linear or non-linear function.

In an embodiment, the step of determining corresponding confidence indexes comprises updating the confidence indexes by retrieving the indication of the social activities, calculating the confidence indexes according to the social activities and storing the confidence indexes in response none of the confidence indexes reaching a confidence threshold. However, the confidence threshold may have any value, for example, fixed or changing dynamically, such as according to a quality of the information sources, the same for all the users or set individually for each of them.

In an embodiment, the method comprises, in response to at least one of the confidence indexes reaching the confidence threshold, generating an update flag in a pseudo-random way to be asserted with an assertion probability and to be deasserted with a deassertion probability. However, the update flag may be generated in any way, for example, by any pseudorandom number generator, with any probability of being asserted or deasserted.

In an embodiment, the method comprises, in response to at least one of the confidence indexes reaching the confidence threshold, updating the confidence indexes by retrieving the indication of the social activities, calculating the confidence indexes according to the social activities and storing the confidence indexes in response to the update flag being asserted. However, this update operation may be performed when the update flag is asserted and only when the confidence index of the preferred information source reaches the confidence threshold or always.

In an embodiment, the method comprises, in response to the confidence index of at least one of the information sources reaching the confidence threshold setting the selected information source equal to a preferred information source of the information sources determined according to the confidence indexes in response to the update flag being deasserted or equal to a worse information source different from the preferred information source in response to the update flag being asserted. However, the preferred information source may be determined in any way, for example, simply ordering the confidence indexes defined by the social activities or updated according to any number and type of additional criteria as above, or discarding information sources that are not compliant with one or more requirements, such as acceptable cost or available assets of the user, and the worse information source may be determined in any way, for example, only among the information sources whose confidence indexes do not reach the confidence threshold or among all of them; moreover, as above this update operation may be performed when the update flag is asserted and only when the confidence index of the preferred information source reaches the confidence threshold or always.

More generally, any update operation may be performed in response to the update flag being asserted, for example, always updating the confidence indexes, always selecting the worse information source, alternating them in any way, such as with a round-robin policy or pseudo-randomly.

In an embodiment, the step of setting the selected information source comprises selecting the worse information source in a pseudo-random way among the information sources that have the corresponding confidence indexes not reaching the confidence threshold. However, the worse information source may also be selected in any other way, for example, with a round-robin policy, etc.

In an embodiment, the method comprises updating the assertion probability and the deassertion probability incrementing the assertion probability by a delta value and decrementing the deassertion probability by the delta value, in response to the update flag being deasserted. However, the delta value may be of any type, for example, fixed or changing over time in any way; moreover, the possibility is not excluded of updating the assertion/deassertion probabilities at different or additional times (e.g. periodically) or of leaving the probabilities always at the same values.

In an embodiment, the method comprises resetting the assertion probability and the deassertion probability in response to the update flag being asserted. However, the possibility is not excluded of resetting the assertion/deassertion probabilities at different or additional times (e.g. in any case after a predefined time limit).

In an embodiment, the step of updating the assertion probability and the deassertion probability comprises calculating the delta value according to a logarithmic law. However, the logarithmic law may be of any type (e.g. based on the time or on a progressive number of the information requests); more generally, the delta value may be calculated or the assertion/deassertion probabilities may be updated according to any other law, either linear or non-linear.

In an embodiment, the step of resetting the assertion probability and the deassertion probability comprises resetting the assertion probability to an assertion base value and the deassertion probability to a deassertion base value, the assertion base value being lower than the deassertion base value. However, the assertion base value and the deassertion base value may be of any type, for example, with the assertion base value lower to any extent than, equal to or even higher to any extent than the deassertion base value.

In an embodiment, the method comprises receiving feedback information for one or more previous information requests relating to a topic of the information request. However, the feedback information may be of any type, for example, a vote that is simply positive/negative or defined by any other qualitative/quantitative value) and the feedback information may be received in any way, for example, actually entered by the user or inferred from a behavior thereof; in any case, this feature may be omitted in a simplified implementation.

In an embodiment, the method comprises determining the confidence indexes further according to the feedback information of the previous information requests. However, the confidence indexes may be determined according to the feedback information of any number of previous information requests (e.g. only the most recent ones or all of the information requests) in any way, for example, by only increasing the confidence index of the selected information source in case of positive feedback, only decreasing the confidence index of the selected information source in case of negative feedback, with or without increasing the confidence indexes for the concepts of the selected information, or any combination thereof, down to none.

In an embodiment, the method comprises determining the confidence indexes further according to one or more previous information requests received from the user and matching the information request. However, the previous information requests matching the current one may be determined in any way, for example, when the information requests are the same, relate to the same topic, or have a similarity index reaching a threshold; moreover, the confidence indexes may be determined according to any number of these previous information requests, for example, by taking into account only the most recent ones or all of the information requests, only the previous information requests that precede the current one directly or by no more than a maximum time, in any way according to any linear or non-linear function), down to none.

Generally, similar considerations apply if the same solution is implemented with an equivalent method by using similar steps with the same functions of more steps or portions thereof, removing some steps being non-essential, or adding further optional steps; moreover, the steps may be performed in a different order, concurrently or in an interleaved way at least in part.

An embodiment provides a computer program configured for causing a computing system to perform the above-mentioned method when the computer program is executed on the computing system. An embodiment provides a computer program product, the computer program product comprising a computer readable storage medium having program instructions embodied therewith, the program instructions being executable by a computing system to cause the computing system to perform the same method. However, the computer program may be implemented as a stand-alone module, as a plug-in for a pre-existing computer program (e.g. of a problem tracking system), or even directly in the latter; moreover, the computer program may run on any computing system. In any case, the solution according to an embodiment of the present disclosure lends itself to be implemented even with a hardware structure, for example, by electronic circuits integrated in one or more chips of semiconductor material, or with a combination of software and hardware suitably programmed or otherwise configured.

An embodiment provides a system comprising means configured for performing each of the steps of the above-mentioned method. An embodiment provides a system comprising a circuitry (i.e., any hardware suitably configured, for example, by software) configured for performing each of the steps of the same method. However, the system may be of any type, for example, any physical and/or virtual computing machine, either stand-alone or communicating with other computing machines via any local, wide area, global, cellular or satellite network and exploiting any type of wired and/or wireless connections.

Generally, similar considerations apply if the system has a different structure or comprises equivalent components or the system has other operative characteristics. In any case, every component thereof may be separated into more elements, or two or more components may be combined together into a single element; moreover, each component may be replicated to support the execution of the corresponding operations in parallel. Moreover, unless specified otherwise, any interactivity between different components generally does not need to be continuous, and the interactivity may be either direct or indirect through one or more intermediaries.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one embodiment, the system of the present invention may be or include a hardware device such as a computer, portable device, etc. In one embodiment, the hardware device is or includes a special-purpose device (e.g., computer, machine, portable device) that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

A computer program product of the present invention may include one or more computer readable hardware storage devices having computer readable program code stored therein, said program code containing instructions executable by one or more processors of a computing system (or computer system) to implement the methods of the present invention.

A computer system of the present invention may include one or more processors, one or more memories, and one or more computer readable hardware storage devices, said one or more hardware storage devices containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for retrieving information, the method comprising:

receiving, by a processor of a computing system, an information request;

determining, by the processor, corresponding confidence indexes of a plurality of information sources, each of the confidence indexes being indicative of a capability of the corresponding information source to respond to the information request determined according to one or more social activities relating to the handling of the information request in the information source based on social messages expressing a positive or negative attitude with respect to the information retrieved by the information source in response to similar information requests, wherein the determining the corresponding confidence indexes comprises:

updating, by the processor, the confidence indexes by retrieving the indication of the one or more social activities, calculating, by the processor, the confidence indexes according to the one or more social activities, and storing, by the processor, the confidence indexes in response to none of the confidence indexes reaching a confidence threshold, and in response to at least one of the confidence indexes reaching the confidence threshold:

generating, by the processor, an update flag in a pseudo-random way to be asserted with an assertion probability and to be deasserted with a deassertion probability; and updating, by the processor, the confidence indexes by retrieving the indication of the one or more social activities, calculating, by the processor, the confidence indexes according to the one or more social activities, and storing, by the processor, the confidence indexes in response to the update flag being asserted;

selecting, by the processor, a selected information source of the plurality of information sources according to the confidence indexes;

submitting, by the processor, the information request to the selected information source;

receiving, by the processor, selected information from the selected information source in response to the information request;

returning, by the processor, the selected information as a result of the information request.

2. The method according to claim 1, wherein the information sources are accessible through a communication network, the determining corresponding confidence indexes comprising:

determining, by the processor, each of the confidence indexes according to the corresponding social activities in one or more social network services implemented over the communication network.

3. The method according to claim 1, wherein the updating the confidence indexes comprises:

collecting, by the processor, one or more corresponding social messages shared among persons in the social network services relating to a topic of the information request in each of the information sources, and calculating, by the processor, each of the confidence indexes according to a sentiment in the corresponding social messages with respect to the topic of the information request in the corresponding information source.

4. The method according to claim 1, further comprising, in response to at least one of the confidence indexes reaching the confidence threshold:

generating, by the processor, an update flag in a pseudo-random way to be asserted with an assertion probability and to be deasserted with a deassertion probability; and setting, by the processor, the selected information source equal to a preferred information source of the information sources determined according to the confidence indexes in response to the update flag being deasserted or equal to a worse information source different from the preferred information source in response to the update flag being asserted.

5. The method according to claim 4, wherein the setting the selected information source comprises:

selecting, by the processor, the worse information source in a pseudo-random way among the information sources having the corresponding confidence indexes not reaching the confidence threshold.

6. The method according to claim 1, further comprising:
updating, by the processor, the assertion probability and the deassertion probability, by incrementing the assertion probability by a delta value and decrementing the deassertion probability by the delta value, in response to the update flag being deasserted; and
resetting, by the processor, the assertion probability and the deassertion probability in response to the update flag being asserted.

7. The method according to claim 6, wherein the updating the assertion probability and the deassertion probability comprises:
calculating, by the processor, the delta value according to a logarithmic law.

8. The method according to claim 6, wherein the resetting the assertion probability and the deassertion probability comprises:
resetting, by the processor, the assertion probability to an assertion base value and the deassertion probability to a deassertion base value, the assertion base value being lower than the deassertion base value.

9. The method according to claim 1, further comprising
receiving, by the processor, feedback information for one or more previous information requests relating to a topic of the information request; and
determining, by the processor, the confidence indexes further according to the feedback information of the previous information requests.

10. The method according to claim 1, further comprising:
determining, by the processor, the confidence indexes further according to one or more previous information requests received from the user and matching the information request.

11. A computer program product, comprising a computer readable hardware storage device storing a computer readable program code, the computer readable program code comprising an algorithm that when executed by a computer processor of a computing system implements a method for retrieving information, the method comprising:
receiving, by a processor of a computing system, an information request;
determining, by the processor, corresponding confidence indexes of a plurality of information sources, each of the confidence indexes being indicative of a capability of the corresponding information source to respond to the information request determined according to one or more social activities relating to the handling of the information request in the information source based on social messages expressing a positive or negative attitude with respect to the information retrieved by the information source in response to similar information requests, wherein the determining the corresponding confidence indexes comprises:
updating, by the processor, the confidence indexes by retrieving the indication of the one or more social activities, calculating, by the processor, the confidence indexes according to the one or more social activities, and storing, by the processor, the confidence indexes in response to none of the confidence indexes reaching a confidence threshold, and in response to at least one of the confidence indexes reaching the confidence threshold:
generating, by the processor, an update flag in a pseudo-random way to be asserted with an assertion probability and to be deasserted with a deassertion probability; and
updating, by the processor, the confidence indexes by retrieving the indication of the one or more social activities, calculating, by the processor, the confidence indexes according to the one or more social activities, and storing, by the processor, the confidence indexes in response to the update flag being asserted;
selecting, by the processor, a selected information source of the plurality of information sources according to the confidence indexes;
submitting, by the processor, the information request to the selected information source;
receiving, by the processor, selected information from the selected information source in response to the information request; and
returning, by the processor, the selected information as a result of the information request.

12. A computer system comprising:
a processor;
a memory device coupled to the processor; and
a computer readable storage device coupled to the processor, wherein the storage device contains program code executable by the processor via the memory device to implement a method for retrieving information, the method comprising:
receiving, by a processor of a computing system, an information request;
determining, by the processor, corresponding confidence indexes of a plurality of information sources, each of the confidence indexes being indicative of a capability of the corresponding information source to respond to the information request determined according to one or more social activities relating to the handling of the information request in the information source based on social messages expressing a positive or negative attitude with respect to the information retrieved by the information source in response to similar information requests, wherein the determining the corresponding confidence indexes comprises:
updating, by the processor, the confidence indexes by retrieving the indication of the one or more social activities, calculating, by the processor, the confidence indexes according to the one or more social activities, and storing, by the processor, the confidence indexes in response to none of the confidence indexes reaching a confidence threshold, and in response to at least one of the confidence indexes reaching the confidence threshold:
generating, by the processor, an update flag in a pseudo-random way to be asserted with an assertion probability and to be deasserted with a deassertion probability; and
updating, by the processor, the confidence indexes by retrieving the indication of the one or more social activities, calculating, by the processor, the confidence indexes according to the one or more social activities, and storing, by the processor, the confidence indexes in response to the update flag being asserted;
selecting, by the processor, a selected information source of the plurality of information sources according to the confidence indexes;

submitting, by the processor, the information request to the selected information source;

receiving, by the processor, selected information from the selected information source in response to the information request; and returning, by the processor, the selected information as a result of the information request.

\* \* \* \* \*